US008053948B2

(12) United States Patent
Suzuki et al.

(10) Patent No.: US 8,053,948 B2
(45) Date of Patent: Nov. 8, 2011

(54) ELECTROSTATIC INDUCTION CONVERSION DEVICE

(75) Inventors: Yuji Suzuki, Tokyo (JP); Nobuhide Kasagi, Tokyo (JP); Yasuhiro Arakawa, Tokyo (JP)

(73) Assignee: The University of Tokyo, Tokyo (JP)

( * ) Notice: Subject to any disclaimer, the term of this patent is extended or adjusted under 35 U.S.C. 154(b) by 503 days.

(21) Appl. No.: 12/285,285

(22) Filed: Oct. 1, 2008

(65) Prior Publication Data

US 2009/0051242 A1 Feb. 26, 2009

Related U.S. Application Data

(62) Division of application No. 11/155,915, filed on Jun. 16, 2005, now Pat. No. 7,449,811.

(30) Foreign Application Priority Data

Nov. 26, 2004 (JP) ................................ 2004-342376

(51) Int. Cl.
*H04R 25/00* (2006.01)

(52) U.S. Cl. ........... 310/309; 310/300; 430/56; 524/544

(58) Field of Classification Search .................. 310/309, 310/300; 430/56; 524/544
See application file for complete search history.

(56) References Cited

U.S. PATENT DOCUMENTS

| | | | | |
|---|---|---|---|---|
| 4,642,504 | A * | 2/1987 | Jacobsen | 310/308 |
| 5,439,768 | A * | 8/1995 | Matsuo et al. | 430/56 |
| 6,306,688 | B1 * | 10/2001 | Lunceford | 438/127 |
| 2005/0048218 | A1 * | 3/2005 | Weidman | 427/446 |

FOREIGN PATENT DOCUMENTS

| | | | |
|---|---|---|---|
| JP | A 58-6118 | | 1/1983 |
| JP | 63-028280 | * | 2/1988 |
| JP | A 63-028280 | | 2/1988 |
| JP | 63-238111 | * | 10/1988 |
| JP | A 63-238111 | | 10/1988 |
| JP | A 63-238115 | | 10/1988 |
| JP | 02-219478 | * | 9/1990 |
| JP | A 02-219478 | | 9/1990 |
| JP | 2001-177899 | * | 6/2001 |
| JP | A 2001-177899 | | 6/2001 |

OTHER PUBLICATIONS

Arakawa et al; "Micro Seismic Power Generating Using Electret Polymer Film"; The 9$^{th}$ National Symposium on Power and Energy Systems (SPES 2004); Jun. 22, 2004.

* cited by examiner

*Primary Examiner* — Peter D. Mulcahy
*Assistant Examiner* — Henry Hu
(74) *Attorney, Agent, or Firm* — Oliff & Berridge, PLC

(57) ABSTRACT

There is provided an electrostatic induction conversion device which is small, has high conversion efficiency between electric energy and kinetic energy, and can prevent degradation of an electret. The electret is formed by injecting an electric charge into the vicinity of the surface of an insulating material, is disposed between two conductors, and is constructed so that it moves relatively to at least one of the conductors opposite to the electret and converts between electric energy and kinetic energy. As the insulating material forming the electret, it is preferable to use a polymer having a fluorine-containing aliphatic cyclic structure.

5 Claims, 3 Drawing Sheets

ELECTROSTATIC INDUCTION CONVERSION DEVICE

This application is a divisional of U.S. patent application Ser. No. 11/155,915, filed Jun. 16, 2005 now U.S. Pat. No. 7,449,811, the entire contents of which are hereby incorporated by reference.

BACKGROUND OF THE INVENTION

The present invention relates to an improvement of an electrostatic induction conversion device for converting between electric energy and kinetic energy.

Conventionally, a power generator, a microphone or the like using an electret in which an electric charge is injected in an insulating material has been proposed. In an apparatus using the electret as stated above, it is known that conversion efficiency between electric energy and kinetic energy is high. For example, JP-A-58-6118 and Japanese Patent No. 3545982 disclose examples of power generators using electrets.

In the above conventional technique, as a material of the electret, fluorinated resin such as PTFE (polytetrafluoroethylene) or Teflon (registered trademark) AF, silicon oxide or the like is used. However, any of the materials have problems in workability into a fine shape or in that the thickness of the electret is increased in order to raise the output of power generation. For example, with respect to polytetrafluoroethylene, although the thickness of the electret can be made large, there has been a problem that it is available only in the form of a plate member, and its fine processing properties are low. Besides, with respect to Teflon (registered trademark) AF, although spin coating can be performed, since plasma etching is difficult, there has still been a problem that its fine processing properties are not very high. Besides, with respect to silicon oxide, although fine processing can be performed, there has been a problem that the thickness of the electret can not be made large.

Further, in the case where the above material is used, there has also been a problem that the electric charge injected in the electret is lost by moisture in the air, and the electret is deteriorated.

SUMMARY OF THE INVENTION

The invention has been made in view of the above conventional problems, and has an object to provide an electrostatic induction conversion device which is small, has high conversion efficiency between electric energy and kinetic energy.

In order to achieve the above object, the invention is an electrostatic induction conversion device for converting between electric energy and kinetic energy, comprising an electret moving relatively to a conductor and made of a polymer which is obtained by cyclopolymerizing a fluorine-containing monomer having two or more polymerizable double bonds and has a fluorine-containing aliphatic cyclic structure in a main chain.

Besides, the fluorine-containing aliphatic cyclic structure includes one or less etheric oxygen atom.

Besides, in the electrostatic induction conversion device, the electret made of the polymer has a thickness of 10 μm or more, and a surface charge density of 1 $mC/m^2$ or more.

Besides, the invention is an electrostatic induction conversion device for converting between electric energy and kinetic energy, comprising an electret moving relatively to a conductor, and a moisture-proof film covering the electret.

Besides, the moisture-proof film is made of polyparaxylylene or its derivative.

Besides, the electret is made of PTFE (polytetrafluoroethylene), FEP (fluorinated ethylene propylene copolymer), PFA (tetra fluoro ethylene-perfluoro alkylvinyl ether copolymer), silicon oxide or a polymer having a fluorine-containing aliphatic cyclic structure.

Besides, the electret is made of a polymer which is obtained by cyclopolymerizing a fluorine-containing monomer having two or more polymerizable double bonds and has a fluorine-containing aliphatic cyclic structure in a main chain.

Besides, the fluorine-containing aliphatic cyclic structure includes one or less etheric oxygen atom.

Besides, in the electrostatic induction conversion device, the electret made of the polymer has a thickness of 10 μm or more, and a surface charge density of 1 $mC/m^2$ or more.

DESCRIPTION OF THE PREFERRED EMBODIMENTS

Hereinafter, best modes for carrying out the invention will be described with reference to the drawings.

Embodiment 1

Figure 1:
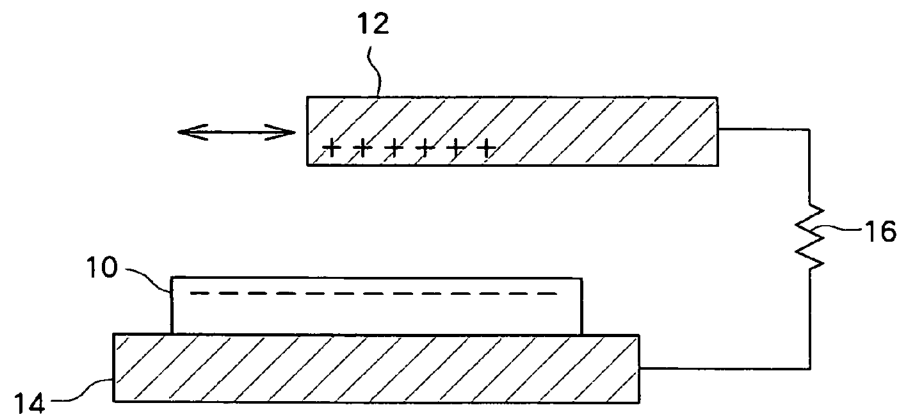
FIG. 1 is a sectional view of a structural example of an electrostatic induction conversion device according to of embodiment 1 of the invention.

FIG. 1 is a sectional view of a structural example of an electrostatic induction conversion device according to embodiment 1 of the invention. In FIG. 1, an electret 10 formed by injecting an electric charge into the vicinity of the surface of an insulating material, is disposed between two conductors 12 and 14, and is constructed so that it can be moved relatively to at least the one conductor 12 opposite to the electret 10. Incidentally, as the injection of the electric charge into the electret 10, a well-known method such as liquid contact, corona discharge, electron beam, or backlighted thyratron can be used.

The two conductors 12 and 14 are electrically connected to a load 16, and when the conductor 12 is moved, for example, in an arrow direction in the drawing, a positive electric charge is electrostatically induced in the conductor 12 by the electric charge (negative electric charge in FIG. 1) injected in the electret 10, and a current flows through the load 16. Accordingly, in this case, the electrostatic induction conversion device of the invention functions as a power generator or a sensor. Application examples of the sensor include a microphone, a pressure sensor, an acceleration sensor, a seismometer, and the like. When a power supply instead of the load 16 is connected to the conductors 12 and 14, the conductor 12 can be moved in the arrow direction of FIG. 1 by electric energy. In this case, the electrostatic induction conversion device of the invention functions as an actuator. As stated above, the electrostatic induction conversion device of the invention functions as a device for converting between electric energy and kinetic energy.

Figure 2:
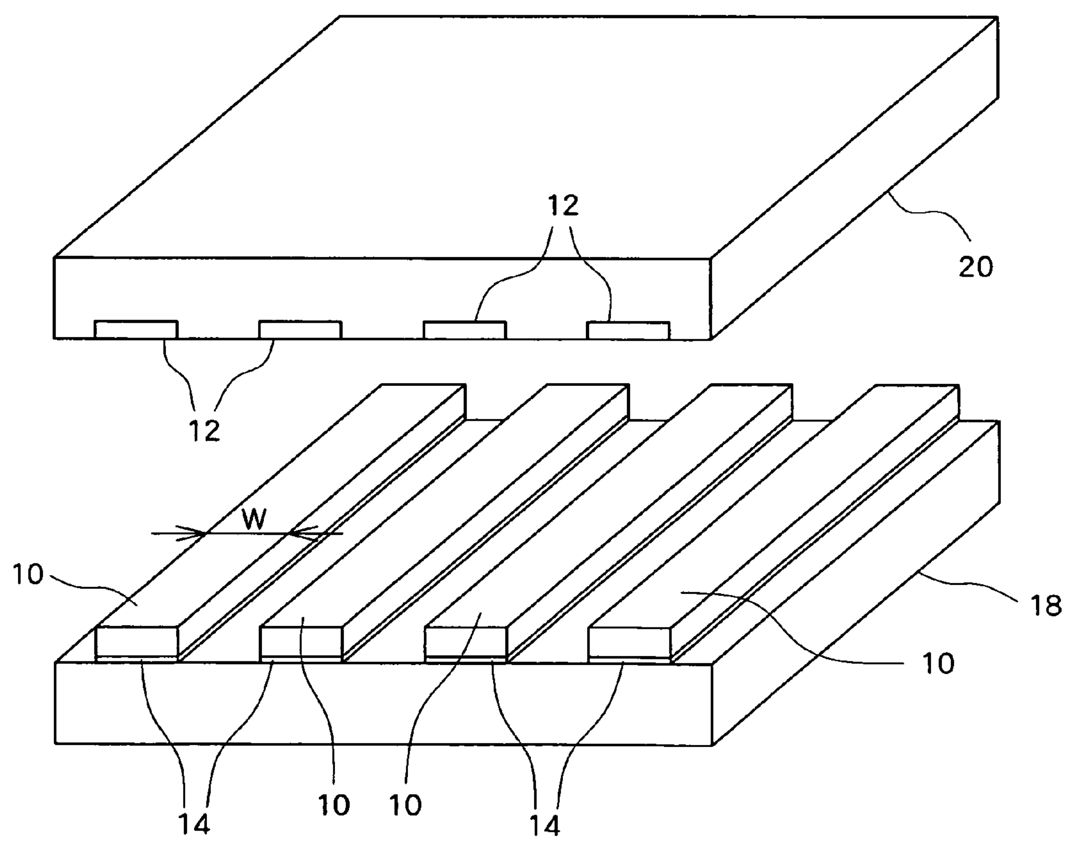
FIG. 2 is a view showing a modified example of the electrostatic induction conversion device according to embodiment 1.

FIG. 2 shows a modified example of the electrostatic induction conversion device of the embodiment. In FIG. 2, plural electrets 10 are formed into strip shapes. Besides, plural conductors 12 and 14 are formed at positions corresponding to the electrets 10. The electrets 10 and the conductors 14 are formed on a substrate 18, and the conductors 12 are formed on a substrate 20. Incidentally, the number of the electrets 10 and the conductors 12 and 14 is not specifically limited, but can be suitably determined.

In this embodiment, as the width of the strip-shaped electret 10 becomes small, conversion between electric energy and kinetic energy can be performed by a smaller relative movement to the conductor 12, and the conversion efficiency can be raised. Thus, it is preferable that the width W of the electret 10 is made, for example, 1 mm or less.

Incidentally, the shape of the electret 10 is not limited to the strip shape. For example, it is also desirable to form a ring shape, a checkered pattern or the like. Further, In the example shown in FIG. 2, although the relative movement between the electret 10 and the conductor 12 is realized by the vibration of one of or both of the substrate 18 and the substrate 20, the invention is not limited to this. For example, it is preferable to adopt such a form that the electret 10 and the conductor 12 are formed into a disk shape, and one of these is rotated, or such a form that a dielectric interposed between the electret 10 and the conductor 12 is moved.

In this embodiment, as the insulating material forming the electret 10, it is preferable to use, for example, a polymer having a fluorine-containing aliphatic cyclic structure. Here, as the polymer having the fluorine-containing aliphatic cyclic structure, it is preferable to use a polymer which is obtained by cyclopolymerizing a fluorine-containing monomer having two or more polymerizable double bonds and has a fluorine-containing aliphatic cyclic structure in a main chain.

To have the fluorine-containing aliphatic cyclic structure in the main chain means having such a structure that one or more carbon atoms constituting the aliphatic ring are carbon atoms in a carbon chain constituting the main chain, and a fluorine atom or a fluorine-containing group is bonded to at least part of carbon atoms constituting the aliphatic ring. Incidentally, the fluorine-containing aliphatic cyclic structure may include one etheric oxygen atom.

The polymer which is obtained by cyclopolymerizing the fluorine-containing monomer having two or more polymerizable double bonds and has the fluorine-containing aliphatic cyclic structure in the main chain is known from JP-A-63-238111 or JP-A-63-238115. That is, there is named a cyclic polymer of a fluorine-containing monomer having two or more polymerizable double bonds, such as perfluoro (allyl vinyl ether) or perfluoro (butenyl vinyl ether), or a copolymer of a fluorine-containing monomer having two or more polymerizable double bonds and a radical polymerizable monomer such as tetrafluoroethylene. Alternatively, a copolymer obtained by copolymerizing a monomer having a fluorine-containing aliphatic cyclic structure, such as perfluoro (2,2-dimethyl-1,3-dioxol), and a fluorine-containing monomer having two or more polymerizable double bonds, such as perfluoro (allyl vinyl ether) or perfluoro (butenyl vinyl ether), may be used.

The polymer having the fluorine-containing aliphatic cyclic structure is preferably the polymer having the fluorine-containing aliphatic cyclic structure in the main chain, and one in which 20 mol % or more of monomer unit having the fluorine-containing aliphatic cyclic structure is contained in the monomer unit forming the polymer is preferable in view of mechanical properties or the like.

The polymer having the fluorine-containing aliphatic cyclic structure in the main chain is put on the market under the registered trademark of "CYTOP" by Asahi Glass Co., Ltd., and in the invention, the well-known fluorine-containing polymer as stated above can be used.

When the foregoing polymer having the fluorine-containing aliphatic cyclic structure is used and the electret 10 is formed by a method of spin coating or the like, the thickness of the electret 10 can be made 10 μm or more.

Besides, in the case where the electrostatic induction conversion device of the embodiment is used as a power generator, the maximum power generation output is expressed by a following expression.

$$P_{max} = \frac{\sigma^2 \cdot n \cdot A \cdot 2\pi f}{\frac{\varepsilon\varepsilon_0}{d}\left(\frac{\varepsilon g}{d} + 1\right)}$$ [Mathematical expression 1]

Here, σ denotes surface charge density of the electret 10, n denotes the number of poles, that is, the number of the electrets 10, A denotes the area of the conductor 14, f denotes the frequency of reciprocal movement of the conductor 12, d denotes the thickness of the electret 10, g denotes the distance between the electret 10 and the conductor 14, and ∈ denotes specific dielectric constant.

As is understood from the above expression, as the thickness d of the electret 10 becomes large, the power generation output becomes large. In a material which is conventionally used for the electret 10 and can be processed into a strip shape of 1 mm or less, the thickness d of the electret 10 is merely at most several to about 10 μm. On the other hand, in the case where the above polymer having the fluorine-containing aliphatic cyclic structure is used, as described above, the thickness d of the electret 10 can be made 10 μm or more, and the polymer is suitable as the material of the electret 10.

Besides, the dielectric breakdown voltage of CYTOP (registered trademark) as the polymer having the fluorine-containing aliphatic cyclic structure is 11 kV/0.1 mm, and is higher than a dielectric breakdown voltage of 5 kV/0.1 mm of Teflon (registered trademark) AF as a conventionally used material. When the dielectric breakdown voltage can be made high, the amount of charge injection into the electret 10 can be increased, and it is possible to raise the power generation amount in the case where the electret 10 is used for the power generator or the sensibility of a sensor in the case where it is used for the sensor.

Examples of the above described embodiment 1 will be described below.

Example 1

Films with thicknesses of 3 μm and 15 μm were formed by spin coating using CYTOP (registered trademark) CTL-809M made by Asahi Glass Co., Ltd., and the surface charge density was measured after an electric charge was injected by corona discharge. Besides, as a comparison example, although Teflon (registered trademark) AF (Teflon AF 1601S) was used, since formation of a thick film was difficult, a film with a thickness of 3 μm was formed. The surface charge density was measured after the electric charge was injected by corona discharge, and the comparison with the film of CYTOP (registered trademark) with a thickness of 3 μm was performed.

Specifically, a charging condition was as follows: As a needle of the corona discharge, a stainless steel needle with an outer diameter of 0.7 mm and a tip angle of about 15 degrees was used, a DC high voltage power source (HAR-20R5 made by Matsusada Precision Inc.) was used to perform discharge for a predetermined time and at a predetermined voltage, and the sample film was charged. The discharge voltage was made −6 kV, −8 kV and −10 kV. The needle and the sample film were spaced from each other by about 30 mm, a grid (stainless steel wire gauze, 40 mesh, wire diameter of 0.22 mm, opening of 0.415 mm) for stabilizing corona discharge and uniformly injecting electric charge was placed in the vicinity of the middle, and a voltage of −600 V was applied to the grid from another DC power source (PLE-650-0.1 made by Matsusada Precision Inc.).

Incidentally, with respect to the charging time, it is known that the optimum value varies according to the thickness of a sample film. For example, in the sample film with a thickness of 3 μm, the surface charge density becomes highest in the case where the charging time is made 3 minutes, and in the sample film with a thickness of 15 μm, the surface charge density becomes highest in the case where the charging time is made 30 minutes. Thus, in this example, the charging time in which the surface charge density became highest was adopted for each film thickness.

Measurement of the Surface Charge:

A surface potential measuring instrument (Model 279+ Model 1034EH made by MONROE ELECTRONICS) was used, and the surface voltage of the sample film was measured after the charging.

The relation between surface voltage V [V] and surface charge density σ [C/m²] is expressed by a following expression.

$$\sigma = \in \in_0 \times V/d \quad \text{[Mathematical expression 2]}$$

Where, ∈ denotes relative dielectric constant, and d denotes the thickness [m] of an electret.

Incidentally, the relative dielectric constant of CYTOP (registered trademark) is 2.1, and the relative dielectric constant of Teflon (registered trademark) AF is 1.9.

The measurement results are shown in Table 1. Incidentally, the surface charge density in Table 1 is a value in the case where the charging was made under a discharge voltage of −8 kV.

TABLE 1

| | Teflon AF 3 μm | CYTOP 3 μm | CYTOP 15 μm |
|---|---|---|---|
| FILM THICKNESS [m] | $3.00 \times 10^{-8}$ | $3.00 \times 10^{-6}$ | $1.50 \times 10^{-5}$ |
| CHARGING TIME [MINUTE] | 3 | 3 | 30 |
| SURFACE VOLTAGE [V] AT NEEDLE VOLTAGE OF −6 KV | −200 | −450 | −420 |
| SURFACE VOLTAGE [V] AT NEEDLE VOLTAGE OF −8 KV | −200 | −450 | −1100 |
| SURFACE VOLTAGE [V] AT NEEDLE VOLTAGE OF −10 KV | −200 | −370 | −910 |
| MAXIMUM SURFACE VOLTAGE [V] | −200 | −450 | −1100 |
| RELATIVE DIELECTRIC CONSTANT [−] | 1.9 | 2.1 | 2.1 |
| SURFACE CHARGE DENSITY [C/m²] | $-1.12 \times 10^{-3}$ | $-2.79 \times 10^{-3}$ | $-1.36 \times 10^{-3}$ |

As indicated in Table 1, in the sample film made of CYTOP (registered trademark) and having a thickness of 3 μm, the surface charge density became 2.79 mC (millicoulomb)/m², which was a value 2.5 times as large as 1.12 mC/m² of the surface charge density of the sample film using Teflon (registered trademark) AF and having a thickness of 3 μm. By this, it is understood that in the case where CYTOP (registered trademark) is used, the surface charge density higher than the conventional material can be obtained. Besides, since the thickness of the sample film could be made thick in CYTOP (registered trademark), the sample film with a thickness of 15 μm was produced, and the surface charge density became 1.36 mC/m². There is a tendency that as the film thickness becomes thick, the surface charge density becomes low. However, even when the thickness was 15 μm, the value of the surface charge density was higher than 1.12 mC/m² of the surface charge density of the sample film made of Teflon (registered trademark) AF and having a thickness of 3 μm. By this, it is understood that when CYTOP (registered trademark) is used, the film thickness can be made thick in the state where the surface charge density higher than the conventional material is kept. Accordingly, it is understood that in the case where CYTOP (registered trademark) is used to produce the electret, the higher maximum power generation output can be obtained based on the foregoing expression 1, and it is possible to realize the electrostatic induction conversion device which is smaller and has high conversion efficiency between electric energy and kinetic energy.

Example 2

A film with a thickness of 20 μm was formed by spin coating using CYTOP (registered trademark) CTL-809M made by Asahi Glass Co., Ltd., and an electron was injected by corona discharge, so that an electret with a surface charge density of 0.93 mC/m² and a surface potential of 1000 V was formed. Ten such electrets each having a strip shape of 1 mm×20 mm were formed. Besides, ten conductors opposite to the electrets and each having a strip shape of 1 mm×20 mm were formed, and the area was made 10 mm×20 mm. The conductor was horizontally vibrated at 10 Hz with 1 mm, so that a maximum electric output of 6 microwatts was obtained.

Embodiment 2

Figure 3:
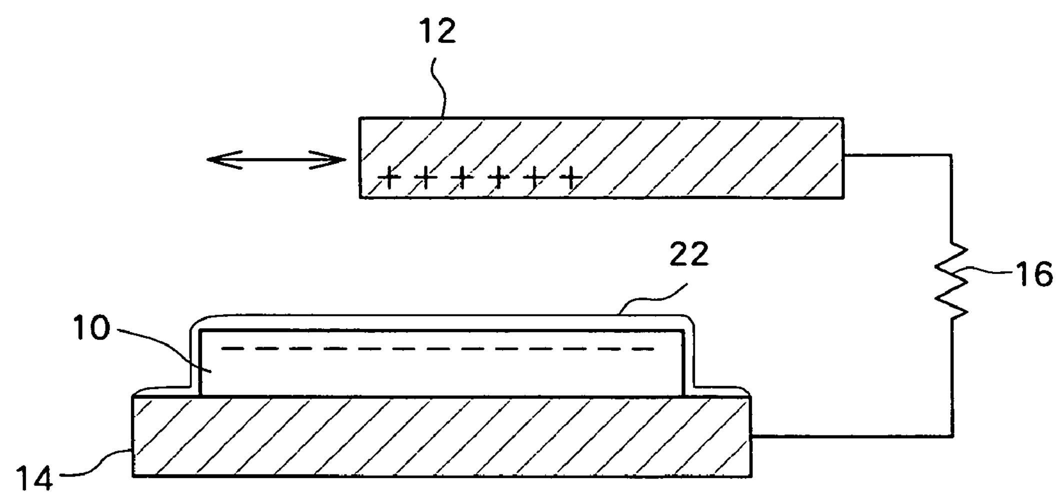
FIG. 3 is a sectional view of a structural example of an electrostatic induction conversion device according to embodiment 2 of the invention.

FIG. 3 is a sectional view of a structural example of an electrostatic induction conversion device according to embodiment 2 of the invention. In FIG. 3, a feature is that the surface of an electret 10 is covered with a moisture-proof film 22. An electric charge injected into the electret 10 is lost by moisture in the air, and the performance of the electret 10 is degraded with the passage of time. However, when the surface of the electret 10 is covered with the moisture-proof film 22, the loss of the electric charge can be prevented, and the time degradation of the electret 10 can be suppressed. Incidentally, in the case of this embodiment, as the material of the electret 10, in addition to CYTOP (registered trademark) described in the embodiment 1, Teflon (registered trademark) AF as a polymer having a fluorine-containing aliphatic cyclic structure, PTFE (polytetrafluoroethylene), FEP (fluorinated ethylene propylene copolymer), PFA (tetra fluoro ethylene-perfluoro alkylvinyl ether copolymer), silicon oxide or the like can also be used.

As the material of the moisture-proof film 22, for example, polyparaxylylene or its derivative (hereinafter referred to as polyparaxylylene class) can be used. This polyparaxylylene class is a specific polymer which can be polymerized in a gas phase at room temperature. For example, after a dimer shown below is sublimated at about 160° C., it is pyrolyzed at 690° C. into monomers, which are introduced into a vacuum container (about 4 Pa) at room temperature, and are polymerized at the surface of a solid.

[Chemical formula 1]

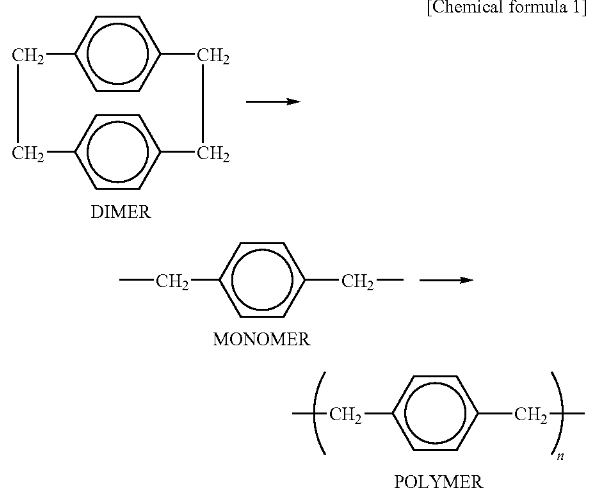

The polyparaxylylene class includes some kinds, and above all, one (trade name is parylene-C) having a molecular structure in which chlorine is attached to a benzene ring has features that dielectric breakdown voltage and chemical resistance are high, and water vapor permeability is very low, and is suitable as the material of the moisture-proof film 22.

Examples of the polyparaxylylene class used as the material of the moisture-proof film 22, including parylene-C, will be shown below. Incidentally, a trade name is indicated under each of structural formulae.

[Chemical formula2]

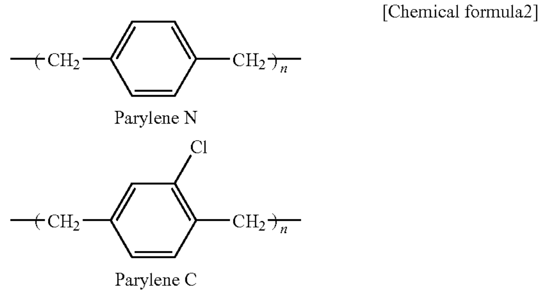

-continued

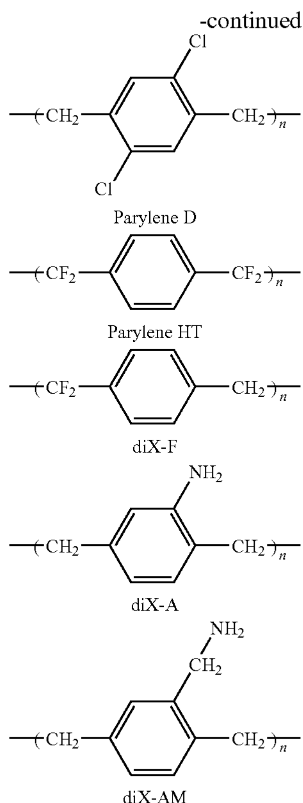

Example 3

An example of the embodiment 2 set forth above will be described below.

An electret with a moisture-proof film was formed in a procedure described below.

1) A film is formed by spin-coating CYTOP (registered trademark) CTL-809M onto a substrate having a conductor as an electrode at one side, and an inside remaining solvent is evaporated by heating.

2) The step of 1) is repeated several times so as to have a predetermined film thickness.

3) The film formed as stated above is heated and cured.

4) A paraxylylene dimer (parylene-C made by SCS Corporation in US) is used, and a moisture-proof film made of polyparaxylylene and having a predetermined thickness is formed in a vapor phase.

5) An electric charge is injected from above the polyparaxylylene film into the film of CYTOP (registered trademark) by corona discharge or electron beam or the like. In the case where the electric charge has a certain degree of energy, the electric charge passes through the polyparaxylylene film and reaches the lower CYTOP (registered trademark) film, and the CYTOP (registered trademark) film is charged to become the electret.

Incidentally, the order of the above steps 4) and 5) is reversed, and the polyparaxylylene film may be formed after the CYTOP (registered trademark) film is charged. Also in this case, it was confirmed that the charge state was not significantly changed before and after the formation of the polyparaxylylene film. This is because the polyparaxylylene film can be formed at room temperature and in the vapor phase. On the other hand, in the case of a general insulator, the temperature of the material is raised by vacuum evaporation or the like and the electric charge is decreased, and in the case of a general polymer, since it is polymerized in liquid, the electric charge is lost by moisture, and it is difficult to maintain the charge state.

Figure 4:
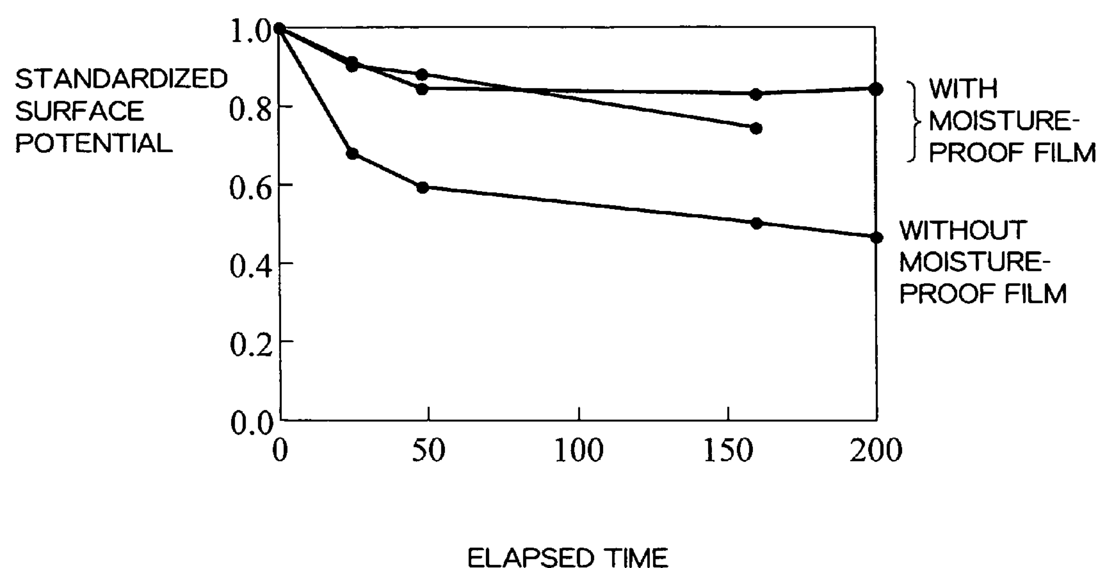
FIG. 4 is a view showing a change in surface potential of an electret from the time immediately after electron injection.

FIG. 4 shows a change in surface potential of an electret (CYTOP film) from the time immediately after electron injection in the case where a polyparaxylylene film with a thickness of 0.3 μm is coated as a moisture-proof film and in the case where coating is not performed. In FIG. 4, the horizontal axis denotes the elapsed time from the time immediately after the electron injection, and the vertical axis denotes the standardized surface potential. From the results shown in FIG. 4, it is understood that the decrease in electric charge from the electret is suppressed by coating the polyparaxylylene film.

What is claimed is:

1. An electrostatic induction conversion device for converting between electric energy and kinetic energy, comprising:

an electret moving relatively to a conductor; and a moisture-proof film covering the electret, wherein the moisture-proof film is made of polyparaxylylene or a derivative of polyparaxylylene.

2. An electrostatic induction conversion device according to claim 1, wherein the electret is made of PTFE (polytetrafluoroethylene), FEP (fluorinated ethylene propylene copolymer), PFA (tetra fluoro ethylene-perfluoro alkylvinyl ether copolymer), silicon oxide or a polymer having a fluorine-containing aliphatic cyclic structure.

3. An electrostatic induction conversion device according to claim 1, wherein the electret is made of a polymer which is obtained by cyclopolymerizing a fluorine-containing monomer having two or more polymerizable double bonds and has a fluorine-containing aliphatic cyclic structure in a main chain.

4. An electrostatic induction conversion device according to claim 3, wherein the fluorine-containing aliphatic cyclic structure includes one or less etheric oxygen atom.

5. An electrostatic induction conversion device according to claim 3, wherein the electret made of the polymer has a thickness of 10 μm or more, and a surface charge density of 1 $mC/m^2$ or more.

* * * * *